United States Patent Office 3,368,877
Patented Feb. 13, 1968

3,368,877
PLUTONIUM CARBONITRIDE
James L. Guyton, Amarillo, Tex., and Milton A. Thompson, Boulder, Colo., assignors to the United States of America as represented by the United States Atomic Energy Commission
No Drawing. Filed Dec. 16, 1965, Ser. No. 514,408
3 Claims. (Cl. 23—344)

ABSTRACT OF THE DISCLOSURE

A method of making plutonium carbonitride from solid plutonium carbide and plutonium metal in which the carbide and metal are nitrided with ammonia and heated to about 1,000° C. Thereafter the mixture is homogenized under vacuum at the above temperature.

---

The invention described herein was made in the course of, or under, a contract with the United States Atomic Energy Commission.

This invention concerns a new composition of matter, plutonium carbonitride, and a process for making the same.

Nuclear fuels generate large amounts of heat which must be transferred from the fuel in order to produce power and to protect the fuel. The transfer of heat from the fuel to a cooling medium is a complex problem because, in part, most coolants are chemically active, and the fuel cannot directly contact these coolants without destruction through chemical reaction. However, whichever, method is used to protect the fuel from the coolant, good heat-transfer throughout the temperature range in which the fuel operates must be maintained. The protection method most commonly used is to enclose the fuel in a container.

Some of the problems encountered in the protection of nuclear fuels by canning are: bursting of the can due to fuel expansion during operation at high temperatures; poor heat-transfer between the fuel and coolant due to ineffective or defective bonds between the fuel and container; and failure of the container due to chemical reactions between the fuel and container. Two important characteristics for a nuclear fuel are a high melting point and low chemical reactivity.

In deciding which nuclear fuels are the most advantageous, attention must also be given to the problems of fuel fabrication. Since plutonium fuels are radioactive, they present safety and health problems for the people who work with them. Any process which requires extensive handling and/or extensive preparation of chemicals is to be avoided where possible. Plutonium powders present problems in the laboratory because they are difficult to contain and handle safely. Extra preparation is needed to convert metals or cermets into powder; therefore, extra precaution is necessary to insure these powders do not escape into the laboratory atmosphere. In the fabrication of plutonium fuels, the use of solid material wherever possible is desirable, and the process should be as uncomplicated as possible.

Economics play an important part in fuel synthesis insofar as the building specifications of the reactor, to some extent, depend upon the volume the fuel occupies, and larger fuel volume means larger reactor volume which translates into time and money. Usually combinations of fissionable and nonfissionable materials are used in nuclear fuels to obtain the required physical and chemical characteristics. As nonfissionables are added to fissionable the product produces less reactivity per unit volume. High fissionable-material density in a reactor fuel is extremely desirable because the cost of the reactor may be lessened according to the size of the core.

Another aspect of the economic problem is the fabrication efficiency. Fissionable material is expensive, and the higher the conversion of fissionable material to product per cycle, the cheaper the cost of the process will be. In addition, the facility with which the process can produce various fuel compositions without extensive alterations in equipment or procedure is important if the fuel is to be utilized for experimental purposes.

Heretofore a fuel has not been fabricated encompassing all the above-mentioned qualities; however, a process has now been discovered for making a new composition of matter, plutonium carbonitride, which is 100% efficient, uses solids for starting materials, and can produce various product compositions. Plutonium carbonitride has a melting point in excess of 2000° C., is chemically stable in air at temperatures over 300° C., and has a fissionable material density of over 94 weight percent.

The ease of use and versatility of the process can best be illustrated by reference to the following examples.

Example I

A solid cermet of 72 weight percent plutonium carbide and 28 weight percent plutonium metal was placed into a container which was evacuated to a pressure of $5 \times 10^{-5}$ mm. or less. The container was back-filled with ammonia gas to a pressure of 350 mm. and heated to a temperature of 1100° C. for three hours. The ammonia gas was evacuated until the pressure in the container was $6 \times 10^{-4}$ mm. or less and the product was heated to 1100° C. under this vacuum for three hours. After the three-hour heating period the container was cooled to room temperature and the gray-colored solid plutonium carbonitride was removed. The yield was 100%.

Example II

A solid cermet of 50 weight percent plutonium carbide and 50 weight percent plutonium metal was placed into a container which was evacuated, then filled with ammonia to a pressure of 400 mm. and heated to a temperature of 1000° C. for three hours. The ammonia was evacuated after three hours, and the container was held under dynamic vacuum for three hours at 1100° C. The container was cooled to room temperature and the product was extracted. The yield was 100%.

The above procedure was used to produce plutonium carbonitride wherein the plutonium carbide weight percent was 72, 50 and 33. Since plutonium nitride is soluble in plutonium carbide in any proportion, plutonium carbonitride can be produced for any plutonium carbide weight percent desirable. In all these cases the same procedure was operative; the plutonium-containing starting materials were solids, not powders, and no remelting of the cermets or recharging of the ammonium atmosphere was required. Regardless of the carbon content of the starting materials, stoichiometric plutonium carbonitride resulted because the plutonium carbide did not react with or dissolve the ammonia atmosphere.

The following table sets out physical properties of some of the different combinations of plutonium carbonitride.

| Cermet Composition | Melting Point at 1.0 atm. $N_2$ | Lattice Parameter | Corrosion in Air | Corrosion in $H_2$ | Corrosion in $H_2O$ | Thermogravimetric Analysis | |
|---|---|---|---|---|---|---|---|
| | | | | | | In air at 0.5 atm. | In vacuum at 5μ |
| 72 w./o. PuC-28 w./o. Pu. | 2,224° C.±30° C. | 4.917±.002 | Slower than α Pu. | 15% reacted after 5 hrs. at 95 p.s.i.g. and 25° C. | Oxidized to $PuO_2$ powder. | Oxidation started at 320° C. Continued to and stopped at 385° C. | No significant weight change. |
| 50 w./o. PuC-50 w./o. Pu. | 2,340° C.±30° C. | | Faster than α Pu. | | | | |
| 33 w./o. PuC-67 w./o. Pu. | 2,460° C.±30° C. | 4.936±.002 | ----do---- | 50% reacted after 5 days at 61 p.s.i.g. and 25° C. | Oxidized to $PuO_2$ powder. | Oxidation started at 200° C. Continued to and stopped at 450° C. | Do. |

Also, of some importance are the following properties: the product obtained from a 72 w./o. plutonium carbide—28 w./o. plutonium starting material is stable in air to 345° C.; the same product is stable in relative humidity of 81–99% for 41 days with an increase in sample weight of less than 0.02%, and the plutonium concentration in plutonium carbonitride is 94.8 w./o. as compared to 88.2 w./o. for plutonium dioxide.

The above embodiments are only meant to be illustrations of the invention; the appended claims are intended to define the scope of the invention.

What is claimed is:
1. A new composition of matter, plutonium carbonitride.

2. A process for the preparation of plutonium carbonitride comprising: evacuating a chamber containing plutonium carbide and plutonium metal; filling the chamber with ammonia gas to a pressure of about 200–500 mm. Hg; heating said chamber to a temperature of about 1000–1200° C. for about 3 hours; evacuating the ammonia; and holding the resulting material at a pressure of about 0.1 to 100 microns and a temperature of about 1100–1200° C. for about 3 hours.

3. The process of claim 2 wherein the plutonium carbide and plutonium metal are in the form of a cermet.

References Cited

UNITED STATES PATENTS 3,306,957  2/1967  McLaren _____ 264—0.5
3,334,974  8/1967  Fletcher et al. _____ 23—344

CARL D. QUARFORTH, *Primary Examiner.*

R. L. GRUDZIECKI, *Assistant Examiner.*